(12) United States Patent
Fukagawa

(10) Patent No.: US 10,810,340 B2
(45) Date of Patent: Oct. 20, 2020

(54) SEMICONDUCTOR CHIP DESIGNING METHOD, NON-TRANSITORY STORAGE MEDIUM STORING SEMICONDUCTOR CHIP DESIGNING PROGRAM, SEMICONDUCTOR DEVICE PRODUCTION METHOD, AND ARITHMETIC DEVICE

(71) Applicant: LLC Suugakuya Honpo, Tochigi (JP)

(72) Inventor: Youzou Fukagawa, Tochigi (JP)

(73) Assignee: LLC SUUGAKUYA HONPO, Tochigi (JP)

( * ) Notice: Subject to any disclaimer, the term of this patent is extended or adjusted under 35 U.S.C. 154(b) by 0 days.

(21) Appl. No.: 16/615,942

(22) PCT Filed: May 23, 2017

(86) PCT No.: PCT/JP2017/019143
§ 371 (c)(1),
(2) Date: Nov. 22, 2019

(87) PCT Pub. No.: WO2018/216091
PCT Pub. Date: Nov. 29, 2018

(65) Prior Publication Data
US 2020/0175218 A1 Jun. 4, 2020

(51) Int. Cl.
*G06F 30/392* (2020.01)
*G06F 30/00* (2020.01)
*H01L 23/00* (2006.01)
*H01L 21/02* (2006.01)

(52) U.S. Cl.
CPC ............ *G06F 30/392* (2020.01); *H01L 24/95* (2013.01)

(58) Field of Classification Search
CPC ....... G06F 30/00; G06F 30/392; H01L 21/02; H01L 24/95
See application file for complete search history.

(56) References Cited

U.S. PATENT DOCUMENTS

| 6,314,548 B1 * | 11/2001 | Suzuki | H01L 22/20 257/E21.525 |
| 6,522,940 B1 | 2/2003 | Erck et al. | |
| 6,854,105 B2 * | 2/2005 | Fukagawa | G03F 7/70433 716/55 |

(Continued)

FOREIGN PATENT DOCUMENTS

| JP | 8-96022 | 4/1996 |
| JP | 9-27445 | 1/1997 |

(Continued)

OTHER PUBLICATIONS

International Search Report issued in International Patent Application No. PCT/JP2017/019143, dated Jul. 18, 2017.

*Primary Examiner* — Vuthe Siek
(74) *Attorney, Agent, or Firm* — Greenblum & Bernstein, P.L.C.

(57) ABSTRACT

At the boundary where the number of effective chips changes, at least three grid points of a chip grid intersect with the periphery of a wafer effective region, and a triangle connecting these three grid points together includes therein the wafer center. To design a semiconductor chip, this feature is used to determine, by an analytic process, candidate solutions including different numbers of effective chips. These candidate solutions are used to derive an advantageous solution.

13 Claims, 19 Drawing Sheets

(56) References Cited

U.S. PATENT DOCUMENTS

| | | |
|---|---|---|
| 7,346,886 B2 | 3/2008 | Fukagawa et al. |
| 2003/0172365 A1 | 9/2003 | Fukagawa |
| 2005/0253215 A1 | 11/2005 | Fukagawa et al. |

FOREIGN PATENT DOCUMENTS

| | | |
|---|---|---|
| JP | 11-274053 | 10/1999 |
| JP | 2000-195824 | 7/2000 |
| JP | 2003-518784 | 6/2003 |
| JP | 2003-257843 | 9/2003 |
| JP | 2007-250975 | 9/2007 |
| JP | 4298571 | 7/2009 |

* cited by examiner

FIG.5

| NUMBER | EFFECTIVE CHIP NUMBER | REDUCTION RATIO | WIDTH | LENGTH | X COORDINATE | Y COORDINATE |
|---|---|---|---|---|---|---|
| 1 | 6 | 0.51164 | 17.88230 | 34.95060 | -0.00000 | -17.47530 |
| 2 | 6 | 0.63795 | 19.96790 | 31.30010 | -0.00000 | 15.65005 |
| 3 | 6 | 0.69897 | 20.90110 | 29.90270 | -0.00000 | 14.95135 |
| 4 | 6 | 0.69897 | 20.90110 | 29.90270 | -0.00000 | 14.95135 |
| 5 | 6 | 0.69897 | 20.90110 | 29.90270 | -0.00000 | 14.95135 |
| 6 | 6 | 0.69897 | 20.90110 | 29.90270 | -0.00000 | 14.95135 |
| 7 | 8 | 0.77204 | 21.96640 | 28.45250 | -10.98320 | -0.00000 |
| 8 | 8 | 0.77391 | 21.99300 | 28.41800 | -10.99650 | -0.00000 |
| 9 | 8 | 0.77391 | 21.99300 | 28.41800 | -10.99650 | -0.00000 |
| 10 | 8 | 0.77391 | 21.99300 | 28.41800 | -10.99650 | -0.00000 |
| 11 | 8 | 0.77391 | 21.99300 | 28.41800 | -10.99650 | -0.00000 |
| 12 | 8 | 0.84789 | 23.02020 | 27.15000 | -11.51010 | -0.00000 |
| 13 | 7 | 0.91629 | 23.93070 | 26.11700 | -9.58212 | -0.00000 |
| 14 | 7 | 0.91629 | 23.93070 | 26.11700 | -9.58212 | -0.00000 |
| 15 | 7 | 1.09136 | 26.11700 | 23.93070 | -0.00000 | -9.46369 |
| 16 | 7 | 1.09136 | 26.11700 | 23.93070 | -0.00000 | -9.46369 |
| 17 | 7 | 1.09136 | 26.11700 | 23.93070 | -0.00000 | -9.46369 |
| 18 | 7 | 1.09136 | 26.11700 | 23.93070 | -0.00000 | -9.46369 |
| 19 | 8 | 1.17940 | 27.15000 | 23.02020 | -0.00000 | 11.51010 |
| 20 | 8 | 1.29214 | 28.41800 | 21.99300 | -0.00000 | 10.99650 |
| 21 | 8 | 1.29214 | 28.41800 | 21.99300 | -0.00000 | 10.99650 |
| 22 | 8 | 1.29214 | 28.41800 | 21.99300 | -0.00000 | 10.99650 |
| 23 | 8 | 1.29214 | 28.41800 | 21.99300 | -0.00000 | 10.99650 |
| 24 | 8 | 1.29527 | 28.45250 | 21.96640 | -0.00000 | 10.98320 |
| 25 | 6 | 1.43067 | 29.90270 | 20.90110 | -14.95135 | -0.00000 |
| 26 | 6 | 1.43067 | 29.90270 | 20.90110 | -14.95135 | -0.00000 |
| 27 | 6 | 1.56752 | 31.30010 | 19.96790 | -15.65005 | -0.00000 |
| 28 | 6 | 1.95448 | 34.95060 | 17.88230 | -17.47530 | -0.00000 |

FIG.10

| NUMBER | EFFECTIVE CHIP NUMBER | REDUCTION RATIO | WIDTH | LENGTH | X COORDINATE | Y COORDINATE |
|---|---|---|---|---|---|---|
| 1 | 8 | 0.93134 | 23.28340 | 23.28340 | -0.00000 | 11.64170 |
| 2 | 8 | 0.93134 | 23.28340 | 23.28340 | -0.00000 | 11.64170 |
| 3 | 9 | 0.90510 | 22.62740 | 22.62740 | -0.00000 | -0.00000 |
| 4 | 12 | 0.85865 | 21.46620 | 21.46620 | -10.73310 | 10.73310 |
| 5 | 12 | 0.83301 | 20.82530 | 20.82530 | -10.41265 | 10.41265 |
| 6 | 12 | 0.83301 | 20.82530 | 20.82530 | -10.41265 | 10.41265 |
| 7 | 12 | 0.83301 | 20.82530 | 20.82530 | -10.41265 | 10.41265 |
| 8 | 12 | 0.83301 | 20.82530 | 20.82530 | -10.41265 | 10.41265 |
| 9 | 12 | 0.76800 | 19.20000 | 19.20000 | -9.60000 | -9.60000 |
| 10 | 12 | 0.76800 | 19.20000 | 19.20000 | -9.60000 | -9.60000 |
| 11 | 12 | 0.76574 | 19.14340 | 19.14340 | -9.57170 | 9.57170 |
| 12 | 12 | 0.76574 | 19.14340 | 19.14340 | -9.57170 | 9.57170 |
| 13 | 12 | 0.76574 | 19.14340 | 19.14340 | -9.57170 | 9.57170 |
| 14 | 12 | 0.76574 | 19.14340 | 19.14340 | -9.57170 | 9.57170 |
| 15 | 13 | 0.76028 | 19.00700 | 19.00700 | -5.43059 | -5.43059 |
| 16 | 13 | 0.76028 | 19.00700 | 19.00700 | -5.43059 | -5.43059 |
| 17 | 13 | 0.75309 | 18.82710 | 18.82710 | -5.44700 | -5.44700 |
| 18 | 14 | 0.74507 | 18.62670 | 18.62670 | -2.32834 | 9.31335 |
| 19 | 14 | 0.74507 | 18.62670 | 18.62670 | -2.32834 | 9.31335 |
| 20 | 14 | 0.74507 | 18.62670 | 18.62670 | -2.32834 | 9.31335 |
| 21 | 14 | 0.72859 | 18.21470 | 18.21470 | -2.30537 | 9.10735 |
| 22 | 14 | 0.72859 | 18.21470 | 18.21470 | -2.30537 | 9.10735 |
| 23 | 14 | 0.72859 | 18.21470 | 18.21470 | -2.30537 | 9.10735 |
| 24 | 14 | 0.72859 | 18.21470 | 18.21470 | -2.30537 | 9.10735 |
| 25 | 14 | 0.72859 | 18.21470 | 18.21470 | -2.30537 | 9.10735 |
| 26 | 14 | 0.72859 | 18.21470 | 18.21470 | -2.30537 | 9.10735 |
| 27 | 16 | 0.71307 | 17.82670 | 17.82670 | -0.00000 | 8.91335 |
| 28 | 16 | 0.71307 | 17.82670 | 17.82670 | -0.00000 | 8.91335 |
| 29 | 16 | 0.71097 | 17.77420 | 17.77420 | -0.00000 | 8.88710 |
| 30 | 16 | 0.71097 | 17.77420 | 17.77420 | -0.00000 | 8.88710 |

| NUMBER | EFFECTIVE CHIP NUMBER | REDUCTION RATIO | WIDTH | LENGTH | X COORDINATE | Y COORDINATE |
|---|---|---|---|---|---|---|
| 1 | 7 | 0.98288 | 24.57200 | 25.00000 | -8.60674 | -0.00000 |
| 2 | 7 | 0.98288 | 24.57200 | 25.00000 | -8.60674 | -0.00000 |
| 3 | 7 | 0.97546 | 24.38650 | 25.00000 | -8.69591 | -0.00000 |
| 4 | 7 | 0.97546 | 24.38650 | 25.00000 | -8.69591 | -0.00000 |
| 5 | 8 | 0.92454 | 23.11350 | 25.00000 | -11.55675 | -0.00000 |
| 6 | 8 | 0.92454 | 23.11350 | 25.00000 | -11.55675 | -0.00000 |
| 7 | 8 | 0.92454 | 23.11350 | 25.00000 | -11.55675 | -0.00000 |
| 8 | 8 | 0.92454 | 23.11350 | 25.00000 | -11.55675 | -0.00000 |
| 9 | 8 | 0.91518 | 22.87940 | 25.00000 | -11.43970 | -0.00000 |
| 10 | 8 | 0.83438 | 20.85940 | 25.00000 | -10.42970 | -0.00000 |
| 11 | 8 | 0.80917 | 20.22920 | 25.00000 | -10.11460 | -0.00000 |
| 12 | 11 | 0.65525 | 16.38130 | 25.00000 | -0.00000 | -0.00000 |
| 13 | 11 | 0.65525 | 16.38130 | 25.00000 | -0.00000 | -0.00000 |
| 14 | 12 | 0.61012 | 15.25290 | 25.00000 | -7.62645 | 1.06327 |
| 15 | 14 | 0.53945 | 13.48610 | 25.00000 | -6.74305 | -0.00000 |

SEMICONDUCTOR CHIP DESIGNING METHOD, NON-TRANSITORY STORAGE MEDIUM STORING SEMICONDUCTOR CHIP DESIGNING PROGRAM, SEMICONDUCTOR DEVICE PRODUCTION METHOD, AND ARITHMETIC DEVICE

TECHNICAL FIELD

The present disclosure relates to a semiconductor chip designing method, a non-transitory storage medium storing a semiconductor chip designing program, a semiconductor chip production method, and an arithmetic device, and more particularly to layout design of a reticle for use in semiconductor fabrication, and a method for determining chip arrangement on a wafer using an aligner.

BACKGROUND ART

To reduce semiconductor fabrication cost, any one of methods of Patent Documents 1 to 5 has been used. In such a method, the number of effective chips has been maximized in an effective region of a wafer excluding the invalid area on the outer periphery of the wafer. If the chip shape has already been determined, these methods are used to determine the relative positions of a chip grid and the wafer to maximize the number of effective chips on an exposure step. Furthermore, in thinking back to layout design of a reticle determining the chip shape, with respect to the chip shape, in addition to degree of freedom in shape for maximizing the number of effective chips, a plurality of chips having different lengths and different widths are designed. From such chip designs, a proposal determined by any one of the methods of Patent Documents 1 to 5 to design a semiconductor including many effective chips is selected, and then a semiconductor is fabricated.

CITATION LIST

Patent Documents

Patent Document 1: Japanese Patent No. 4298571
Patent Document 2: Japanese Unexamined Patent Publication No. 2003-257843
Patent Document 3: Japanese Unexamined Patent Publication No. H09-27445
Patent Document 4: Japanese Unexamined Patent Publication No. 2000-195824
Patent Document 5: Japanese Unexamined Patent Publication No. H11-274053

SUMMARY OF THE INVENTION

Technical Problem

However, designing many types of semiconductors having different chip shapes reduces the design efficiency. Thus, there has been a need for a process and an arithmetic device to automatically output the chip length and width that allow the number of effective chips to be maximum, if the initial chip length and width, the range in which the chip length and width are changeable, and constraints in changing the chip length and width are offered.
The constraints include one of the following two constraints.
Constraint 1: The chips have the same area.
Constraint 2: The ratio between the magnifications of the chip length and width is fixed.

The present disclosure has been made to solve the foregoing problems, and it is an object of the present disclosure to achieve a process and an arithmetic device to automatically output the chip length and width that allow the number of effective chips to be maximum, and to provide a semiconductor chip designing method, a non-transitory storage medium storing semiconductor chip designing program, a semiconductor chip production method, and an arithmetic device which improve a method for fabricating a semiconductor.

SOLUTION TO THE PROBLEM

To achieve the object, a method for designing a semiconductor chip according to an aspect of the present disclosure includes: an initial value setting step of determining an initial condition of a shape of chips included in a substantially circular wafer effective region to form a grid plane of a chip grid corresponding to the initial condition of the shape of the chips; a variation range setting step of determining a variation range in which the shape of the chips varies; a region setting step of defining a region within which all ellipses obtained by changing a periphery of the wafer effective region in the grid plane are included in accordance with the variation range; a grid point extraction step of extracting combinations of three grid points included in the region; a candidate solution calculation step of determining an ellipse intersecting with the three grid points of each of the extracted combinations and having major and minor axes parallel to grid lines, and calculating a candidate solution of each of the ellipses, the candidate solution including a rate of change of a length and width of a portion of each ellipse in at least the wafer effective region and the number of effective chips, the number of effective chips being the number of grid cells included in the ellipse; a chip dimension calculation step of calculating a chip length and width of the candidate solution by multiplying the initial condition of the shape of the chips by the rate of change of the chip length and width of the candidate solution; a chip number calculation step of determining the maximum number of effective chips and a center position of the wafer effective region, based on the chip length and width corresponding to the candidate solution and a condition of the wafer effective region; and a selection step of selecting, as a shape of a chip to be designed, a solution that allows the number of effective chips to be greatest within a requirement of layout design of a semiconductor chip from the candidate solutions.

ADVANTAGES OF THE INVENTION

The present disclosure can provide a process and an arithmetic device to automatically output the chip length and width that allow the number of effective chips to be maximum to improve a method for fabricating a semiconductor can be improved.

BRIEF DESCRIPTION OF THE DRAWINGS

FIG. 5 is a table showing candidate solutions obtained in a first example and the associated number of effective chips.

FIG. 10 is a table showing candidate solutions obtained in a second example and the associated number of effective chips.

DESCRIPTION OF EMBODIMENTS

In an embodiment of the present disclosure, the following method is proposed. Specifically, at the boundary where he number of effective chips changes, at least three grid points of a chip grid intersect with the periphery of an effective region of a wafer, and a triangle connecting these three grid points together includes therein the wafer center. This feature is used to determine, by an analytic process, candidate solutions having different numbers of effective chips, and these candidate solutions are used to derive an advantageous solution.

Figure 1:
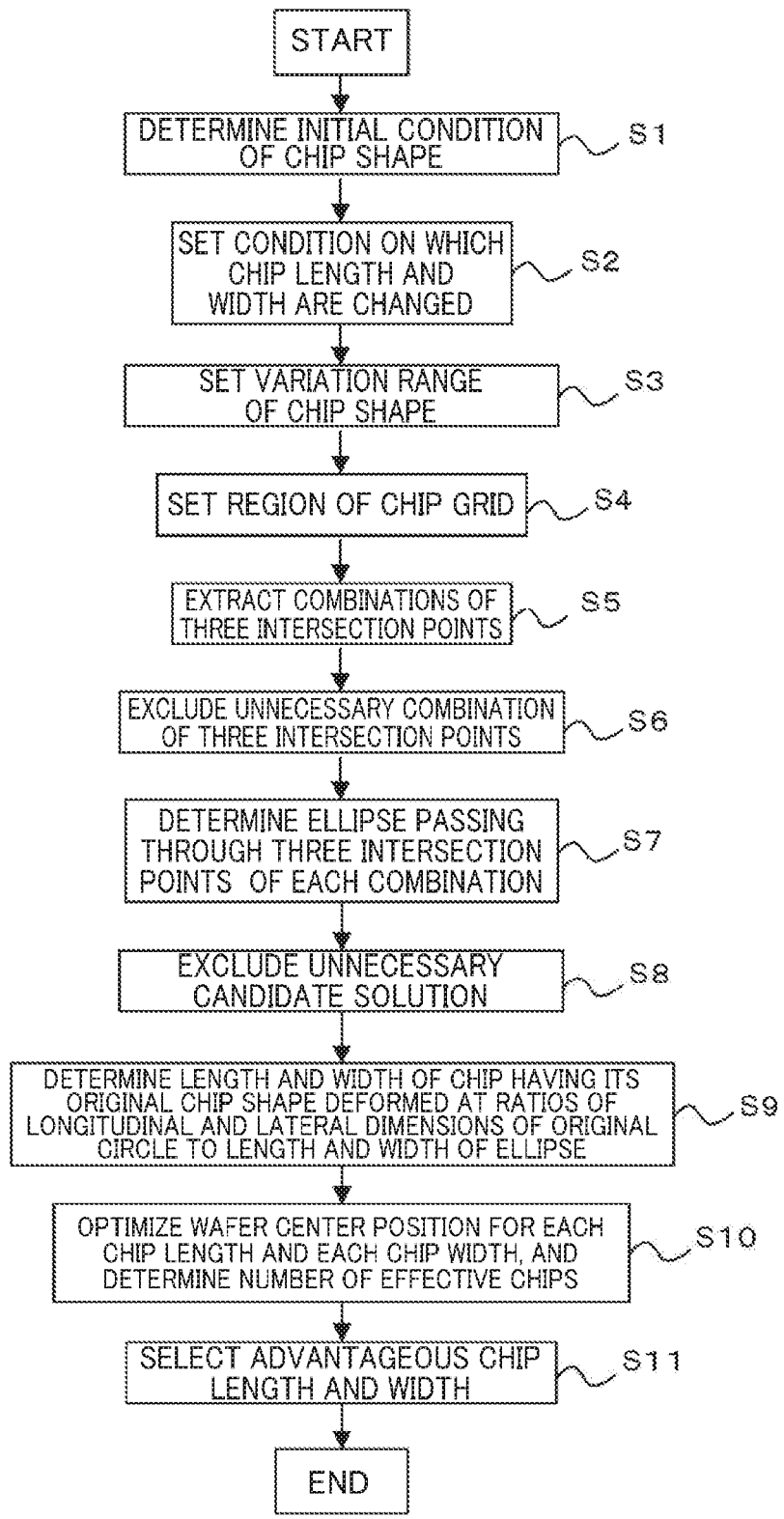
FIG. 1 is a flowchart showing basic steps according to an embodiment of the present disclosure.

Specifically, an advantageous solution is derived from a semiconductor chip designing method including steps shown in FIG. 1.

Figure 2:
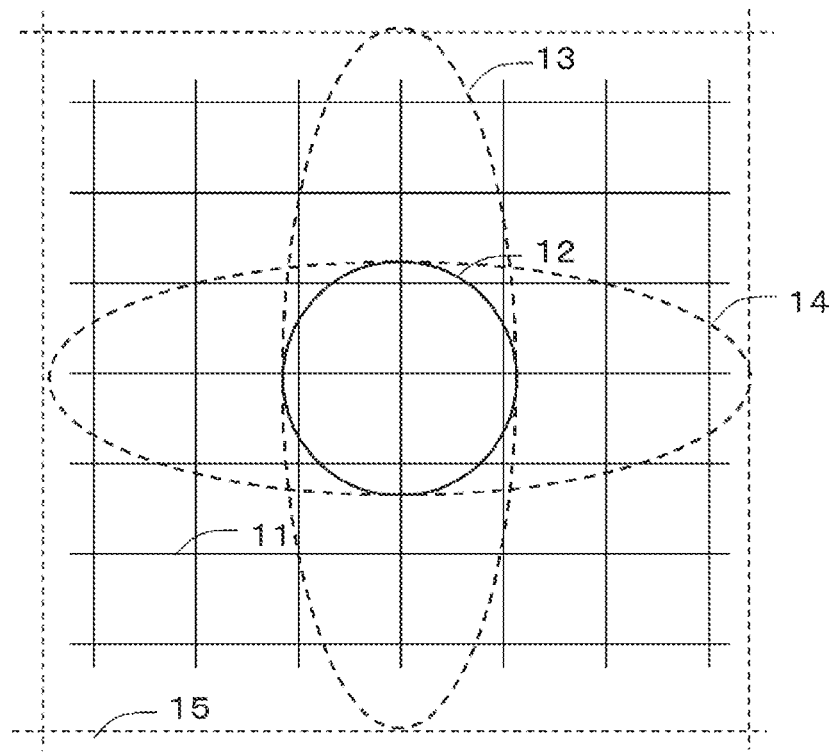
FIG. 2 illustrates a grid range.

In step S1 (an initial value setting step), an initial condition of the chip shape is determined in layout design of a semiconductor. Specifically, the condition of the chip shape, i.e., the chip length and width or the chip area, is determined. The initial condition of the chip shape is determined such that the chip shape allows at least one rectangular semiconductor chip to be within a substantially circular wafer effective region. Then, a grid plane including a chip grid 11 shown in FIG. 2 is formed with reference to the initial condition of the chip shape.

In step S2 (a change condition setting step), conditions on which the chip length and width are changed are set. These conditions merely need to be set, for example, in accordance with the requirements for semiconductor layout design, such as a requirement that chips have the same area (a first example described below), a requirement that the ratio between the rate of change of the chip length and that of the chip width be fixed (a second example described below), and a requirement that only the chip width be changed (a third example described below).

In step S3 (a variation range setting step), the variation range of the chip shape is determined. The variation ranges of the magnifications of the chip length and width (the rate of change of the chip width and the rate of change of the chip length) are determined, for example, such that the chips have the same area or such that the ratio between the rate of change of the chip length and that of the chip width is fixed, or the variation range of the magnification of only the chip width (or length) is determined. As shown in FIG. 2, this variation range of the chip shape corresponds to a range in which an ellipse 13 can be formed. The ellipse 13 is formed by deforming a substantially circular wafer effective region periphery 12 in longitudinal and lateral directions without changing the longitudinal and lateral spacing of the chip grid 11.

In step S4 (a region setting step), a chip grid region 15 where all the grid lines intersecting with the ellipse 13 maximized in the longitudinal direction and an ellipse 14 maximized in the lateral direction intersect with one another is defined.

In step S5 (a grid point extraction step), all combinations of three grid points included in the region 15 are extracted.

In step S6 (a grid point combination exclusion step), unnecessary combinations of grid points are excluded from the combinations of three grid points selected in step S5 (specifically described in detail in a fifth example).

Figure 3:
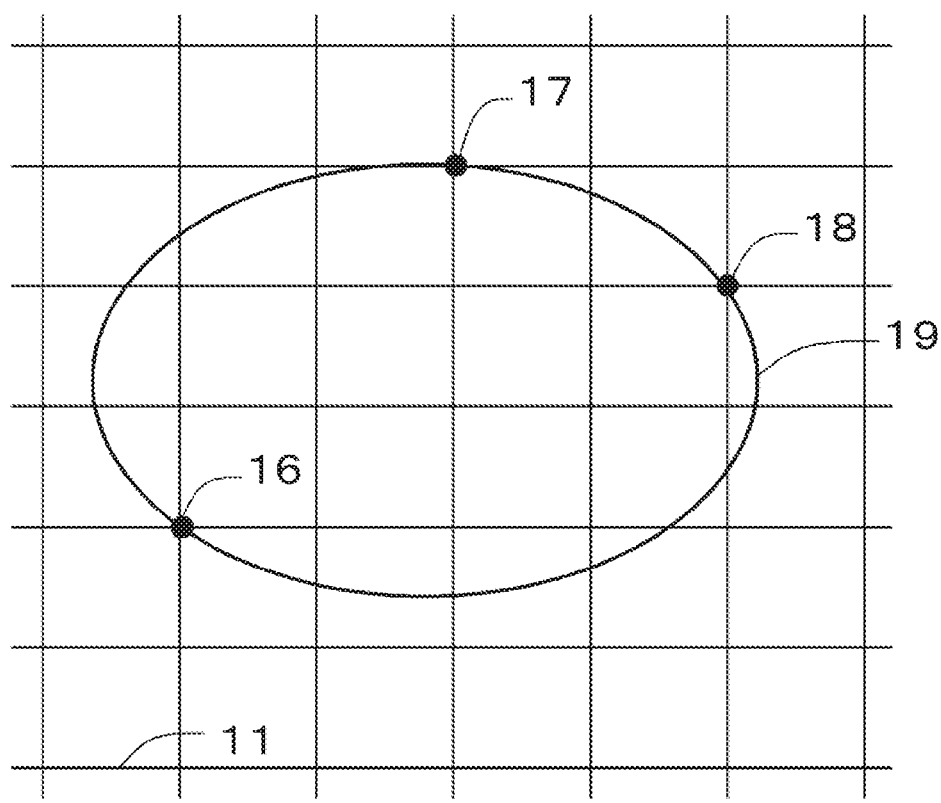
FIG. 3 illustrates three exemplary grid points and an exemplary ellipse passing through these grid points.

In step S7 (a candidate solution calculation step), an ellipse 19 intersecting with three grid points 16, 17, and 18 and having major and minor axes each parallel to the associated grid lines is determined as shown in FIG. 3. This step is expressed by the following formulae 1, 2, 3, and 4. Formula 4 is a function of the relation between the reduction ratio α (change rate) of the width of the ellipse equal to the magnification (change rate) of the chip width and the reduction ratio β (change rate) of the length of the ellipse equal to the magnification (change rate) of the chip length.

$$\alpha^2(x_1-x_0)^2+\beta^2(y_1-y_0)^2-r^2=0 \quad \text{Formula 1}$$

$$\alpha^2(x_2-x_0)^2+\beta^2(y_2-y_0)^2-r^2=0 \quad \text{Formula 2}$$

$$\alpha^2(x_3-x_0)^2+\beta^2(y_3-y_0)^2-r^2=0 \quad \text{Formula 3}$$

$$\beta=f(\alpha) \quad \text{Formula 4}$$

Here, the characters represent the following elements.

α: Reduction Ratio of Width of Ellipse (Magnification of Width of Chip)

β: Reduction Ratio of Length of Ellipse (Magnification of Length of Chip)

$x_0$: X Coordinate of Ellipse Center $y_0$: Y Coordinate of Ellipse Center $x_1$: X Coordinate of First Intersection Point of Original Chip Grid $y_1$: Y Coordinate of First Intersection Point of Original Chip Grid $x_2$: X Coordinate of Second Intersection Point of Original Chip Grid $y_2$: Y Coordinate of Second Intersection Point of Original Chip Grid $x_3$: X Coordinate of Third Intersection Point of Original Chip Grid $y_3$: Y Coordinate of Third Intersection Point of Original Chip Grid r: Radius of Original Wafer Effective Region Circle The high-order simultaneous equations from Formulae 1 to 4 derive four unknown numbers, i.e., the reduction ratio α of the width of the ellipse, the reduction ratio β of the length of the ellipse, the x coordinate $x_0$ of the ellipse center, and the y coordinate $y_0$ of the ellipse center, which are unknown variables. Note that a combination of these four derived values are referred to as a candidate solution.

In step S8 (a candidate solution exclusion step), unnecessary candidate solutions, such as a candidate solution where a triangle connecting three grid points together does not include therein the wafer center, and a candidate solution where at least one of the e grid points is on an ineffective arc, are excluded from candidate solutions obtained in step S7. The ineffective arc is a portion of the wafer effective region periphery. A chip including a grid point on this portion is ineffective.

Figure 4:
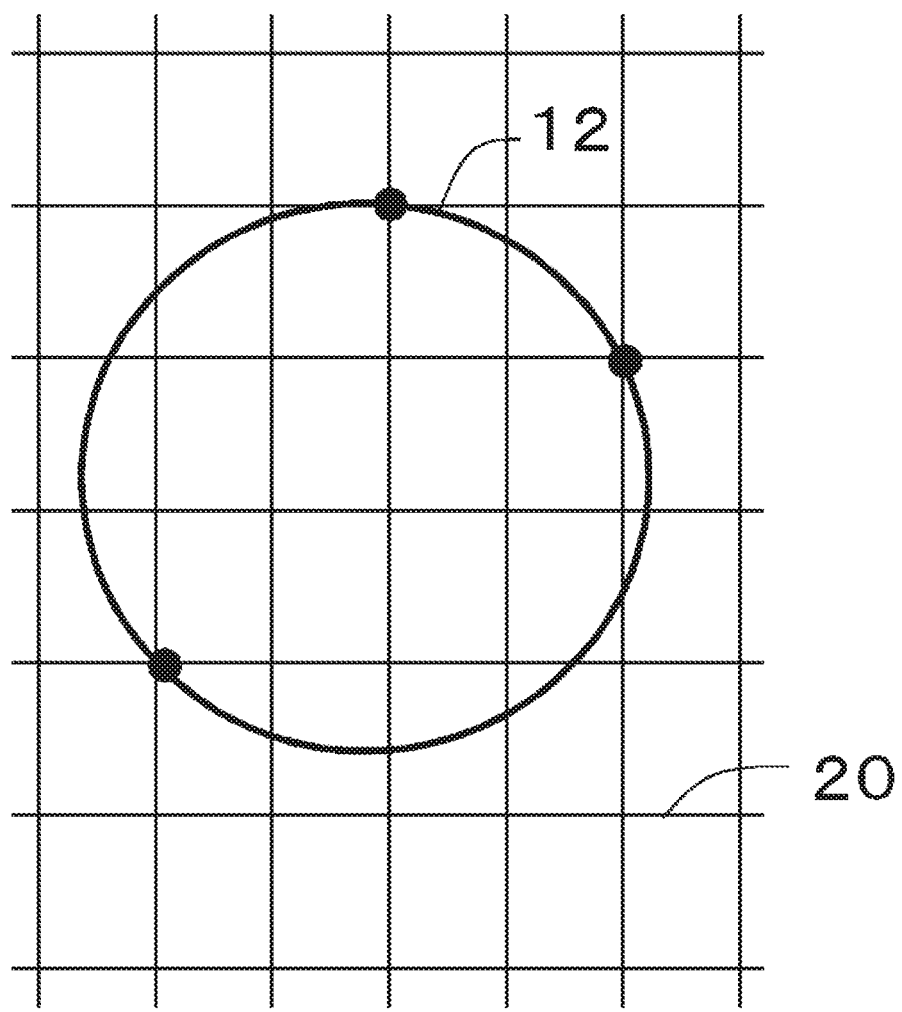
FIG. 4 illustrates a method for determining the chip length and width.

In step S9 (a chip dimension calculation step), the derived ellipse is multiplied by the magnification α of the chip width and the magnification β of the chip length, and the entire original chip grid (the chip grid 11) is also multiplied by the magnification α of the chip width and the magnification β of the chip length, respectively. This allows the ellipse to return to the original wafer effective region periphery 12, and allows the original chip grid to change to a chip grid 20 corresponding to the candidate solutions, as shown in FIG. 4, thus obtaining the chip length and width corresponding to the candidate solution based on the grid spacings. Specifically, as indicated by Formula 5, the original chip width $a_0$ is multiplied by α to determine the chip width $a_1$ of the candidate solution, and as indicated by Formula 6, the original chip length $b_0$ is multiplied by β to determine the chip length $b_1$ of the candidate solution.

$$a_1 = \alpha a_0 \qquad \text{Formula 5}$$

$$b_1 = \beta b_0 \qquad \text{Formula 6}$$

In step S10 (a chip number calculation step), the maximum number of effective chips and the center position of the wafer effective region are determined, for example, by the means of Patent Document 1, based on the chip length and width corresponding to each candidate solution and the condition for the wafer effective region.

In step S11 (a selection step), one of the obtained candidate solutions which allows the number of effective chips to be greatest and which is recommended in terms of layout design, i.e., a solution that allows the number of effective chips to be greatest within the requirements of layout design of a semiconductor chip, is selected. The chip shape is designed such that the chips have a length and a width corresponding to the selected solution.

Determining the chip shape based on the steps shown in FIG. 1 as described above can maximize the number of effective chips.

The present disclosure will now be described in detail with reference to examples.

FIRST EXAMPLE

In the first example, how the number of effective chips is maximized if chips have the same area will be described.

In other words, the first example relates to a case where a condition on which the chip length and width are changed in step S2 shown in FIG. 1 is that Formula 4 should be replaced with Formula 7 where the chips have the same area, i.e., the product of the lengths of the major and minor axes of an ellipse is fixed.

$$\beta = \alpha^{-1} \qquad \text{Formula 7}$$

For example, the length and width of each of rectangular chips which allow the number of effective chips to be maximum and which have the same area, and the coordinates of the center position of a wafer effective region within the chip are determined, where the radius of the wafer effective region is 48 mm, and the chip has an area of 625 mm$^2$. However, the magnification of the chip length and width is set in the range of 0.5 to 2.0 respect to a case where the chip shape is square.

First, a set of grid points indicating a range where three intersection points are selected is prepared. In this example, the magnification of the chip length and width is 0.5 to 2.0. Thus, the x and y coordinates in the range of the grid points where the intersection points are selected are each set in the range of 0 mm to 200 mm, which includes a value (192 mm) obtained by dividing the chip diameter (96 mm) by the minimum magnification (0.5) of the chip length and width. Then, straight lines parallel to the y-axis are arranged at intervals of 25 mm in the x direction from the origin. Other straight lines parallel to the x-axis are also arranged at intervals of 25 mm in the y direction. Three different optional points are selected from these grid points thus formed. The reduction ratio a of the width of an ellipse passing through each of the combinations of three intersection points is determined through solution of simultaneous equations, i.e., Formulae 1 to 3 and 7.

The 28 candidate solutions thus obtained are shown in FIG. 5. FIG. 5 shows the number of effective chips (effective chip number), the ellipse reduction ratio (chip magnification), the chip length and width, and the center position (x and y coordinates) of an effective region of a chip coordinate system having its origin located at the chip center. Next, the maximum number of effective chips is determined by the method of Patent Document 1 or any other method.

Figure 6:
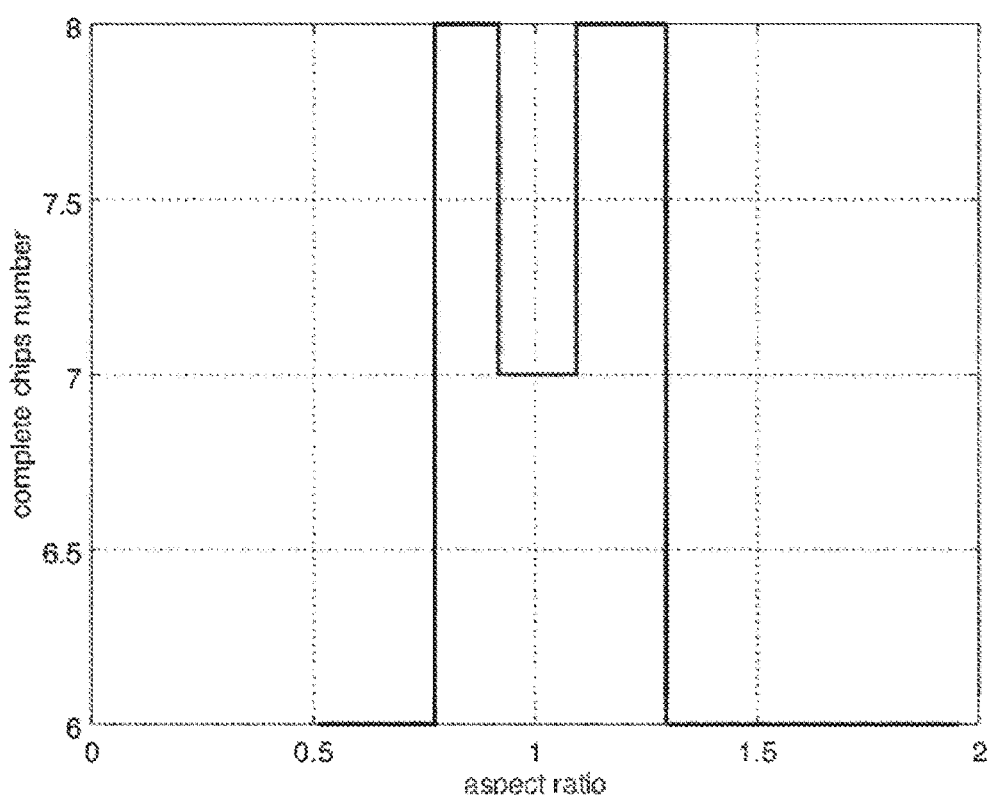
FIG. 6 illustrates the relation between the aspect ratio of a chip of the first example and the number of effective chips.
Figure 7:
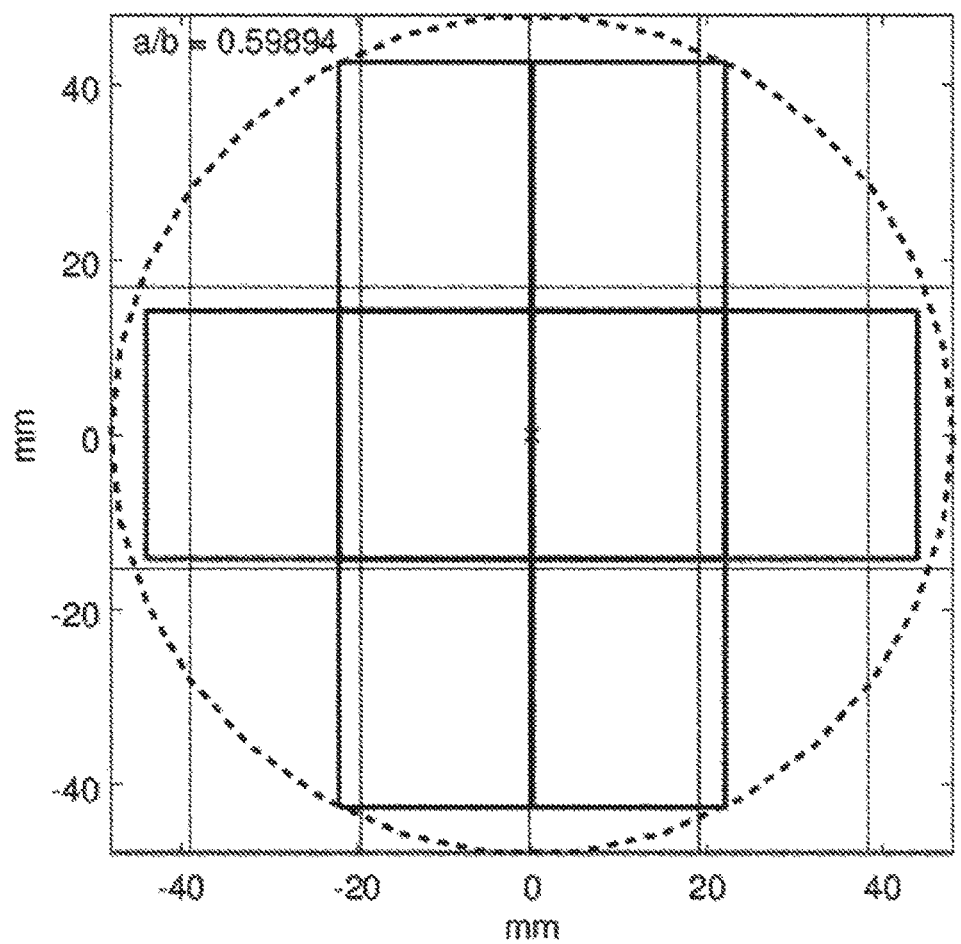
FIG. 7 illustrates an example of the chip layout in the first example.
Figure 8:
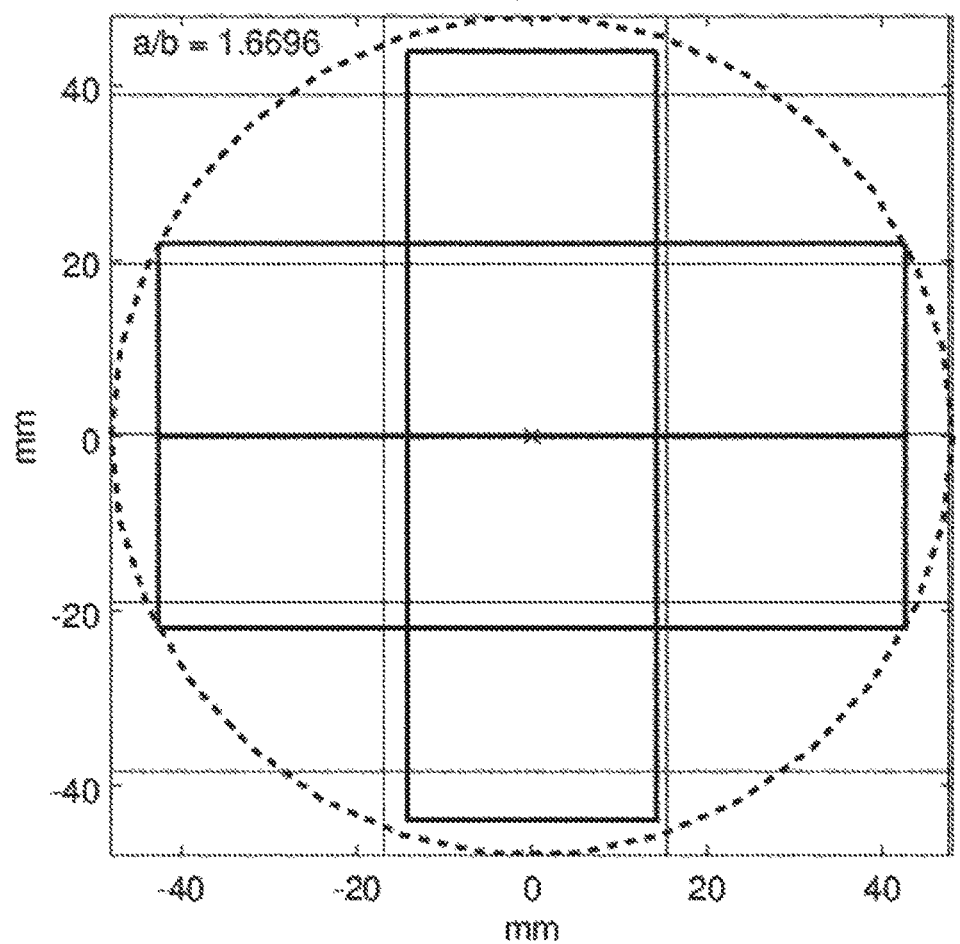
FIG. 8 illustrates another example of the chip layout in the first example.
Figure 9:
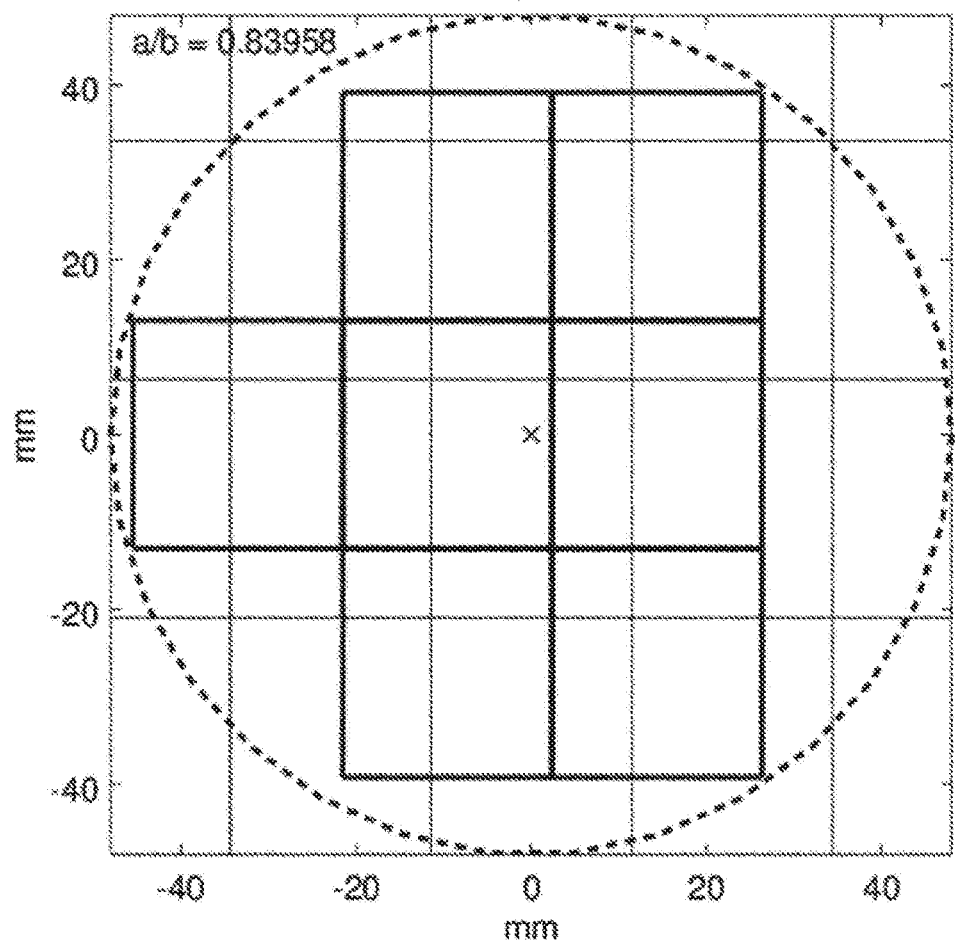
FIG. 9 illustrates still another example of the chip layout in the first example.

FIG. 6 shows the maximum number of effective chips for each of aspect ratios obtained by dividing the chip widths of the candidate solutions by the respective chip lengths. The chip layout of the eighth candidate solution shown in FIG. 7 and the chip layout of the twentieth candidate solution shown in FIG. 8 each provide eight effective chips. The number of effective chips of each of these candidate solutions is greatest among the candidate solutions. Thus, these two candidate solutions are each one of solutions to be determined. In general, the closer to a square the chip shape is, the greater the number of effective chips is expected to be. However, the chip layout of the fourteenth candidate solution including chips having a shape close to a square as shown in FIG. 9 provide only seven effective chips.

The candidate solutions are present at the boundary where the number of effective chips changes, and the number of effective chips decreases with a slight change. Thus, the candidate solutions are not optimum in most cases. An optimal solution is between a plurality of successive candidate solutions that allow the number of effective chips to be maximum. For example, the seventh to twelfth candidate solutions shown in FIG. 5 are successive candidate solutions that allow the number of effective chips to be maximum, i.e., eight. Thus, a solution actually used is recommended to allow the chip width and length to be equal to an intermediate value between the chip widths of the seventh and twentieth candidate solutions and an intermediate value between the chip lengths thereof, respectively. Specifically, the chip width is determined by the following equation: (21.96640+23.02020)/2=22.49330 The chip length is determined by the following equation: (28.45250+27.15000)/2=27.80125 This allows the number of effective chips to be kept at the maximum value, i.e., eight, even if an actual invalid area is slightly larger than expected, or even if there is a little misalignment in the chip layout determined by an aligner.

SECOND EXAMPLE

In the second example, how the number of effective chips is maximized if the ratio between the magnifications of the chip length and width is fixed will be described. The second example relates to a case where Formula 4 is replaced with Formula 8 where the ratio between the magnifications of the chip length and width is fixed, i.e., the ratio between the lengths of the major and minor axes of an ellipse is fixed.

$$\beta = c\alpha \quad \text{Formula 8}$$

Here, the coefficient c of Formula 8 is a positive real number.

For example, if the coefficient c is one, i.e., if the magnification $\beta$ of the chip length is equal to the magnification $\alpha$ of the chip width, the length and width of each of chips at the boundary where the number of effective chips changes, and the coordinates of the center position of a wafer effective region within the chip are determined, where the radius of the wafer effective region is 48 mm, and the original chip (the initial chip) is a square chip having a length and width of 25 mm. The magnification $\alpha$ of the chip width is set to be in the range of 0.5 to 1.0.

First, a set of grid points indicating a range where three intersection points are selected is prepared. In this example, the magnification a of the chip width is 0.5 to 1.0. Thus, the x and y coordinates in the range of the grid points where the intersection points are selected are each set in the range of 0 mm to 200 mm, which includes a value (192 mm) obtained by dividing the chip diameter (96mm) by the minimum magnification (0.5) of the chip width. The range of the y coordinates is set to be c times (one time) the range of the x coordinates. Then, straight lines parallel to the y-axis are arranged at intervals of 25 mm in the x direction from the origin. Other straight lines parallel to the x-axis are also arranged at intervals of 25 mm in the y direction. Three different optional points are selected from these grid points thus formed. The reduction ratio $\alpha$ of the width of an ellipse passing through each of the combinations of three intersection points is determined through solution of high-order simultaneous equations, i.e., Formulae 1 to 3 and 8.

The 30 candidate solutions thus obtained and the respective maximum numbers of effective chips are shown in FIG. 10. FIG. 10 shows the number of effective chips (effective chip number), the ellipse reduction ratio (chip magnification), the chip length and width, and the center position (x and y coordinates) of an effective region of a chip coordinate system having its origin located at the chip center.

Figure 11:
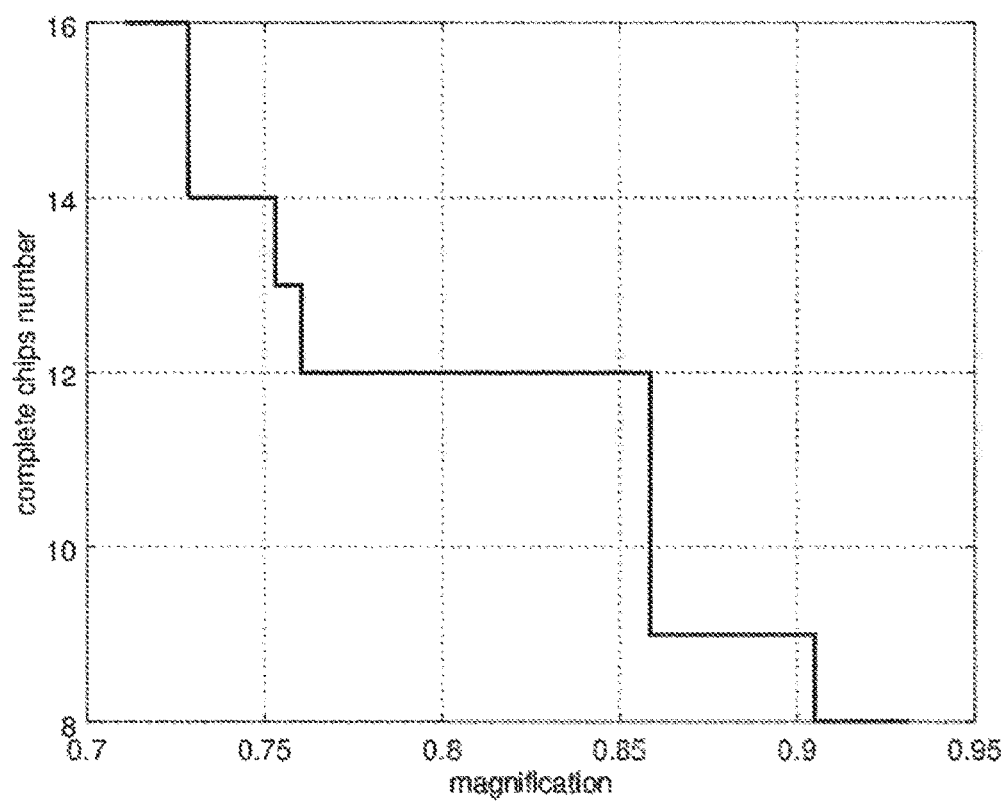
FIG. 11 illustrates the relation between the magnification of the chip length and width of the second example and the number of effective chips.
Figure 12:
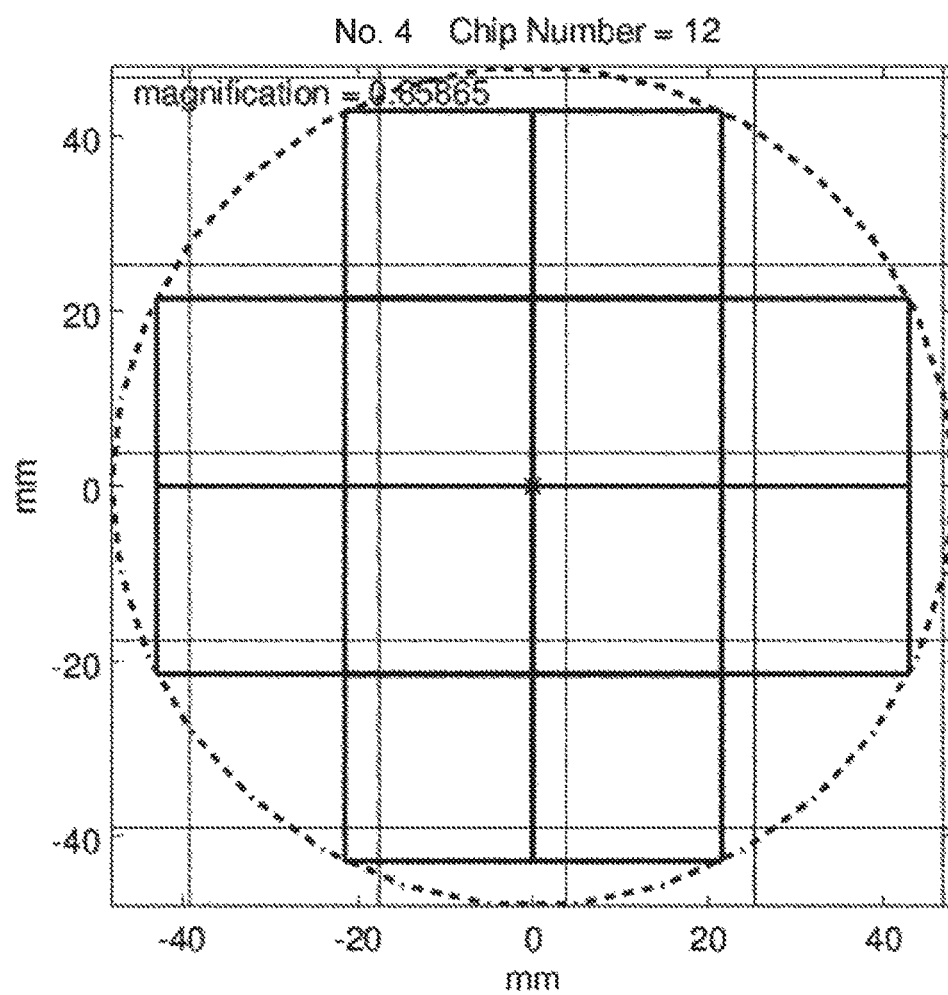
FIG. 12 illustrates an example of the chip layout in the second example.

FIG. 11 shows the maximum number of effective chips for the magnification of the chip length and width of each candidate solution. In this case, as the magnification of the chip length and width decreases, the number of effective chips increases. Thus, the number of effective chips cannot determine whether or not the chips have a suitable length and width. However, if the numbers of effective chips in the candidate solutions are equal, one of the candidate solutions having a greater chip magnification can provide a larger chip area, and is thus advantageous. The chip layout of the fourth candidate solution shown in FIG. 12 and the chip layout of the fourteenth candidate solution shown in FIG. 13 both provide a maximum of 12 effective chips. However, the fourteenth candidate solution that allows the chip size to be large is more advantageous.

THIRD EXAMPLE

In the third example, how the number of effective chips is maximized if one of the chip length and width is fixed, and the other one is adjusted, i.e., if one of the lengths of the ordinate and abscissa axes of an ellipse is fixed will be described.

In this example, a case where only the chip width is shortened without changing the chip length is shown.

For example, the length and width of each of chips at the boundary where the number of effective chips changes, and the coordinate of the center position of a wafer effective region within the chip are determined, where the radius of the wafer effective region is 48 mm, the original chip (the initial chip) is a square chip having a length and width of 25 mm, and the coefficient c of Formula 8 is zero. The magnification a of the chip width is set to be in the range of 0.5 to 1.0.

First, a set of grid points indicating a range where three intersection points are selected is prepared. In this example, the magnification a of the chip width is 0.5 to 1.0. Thus, the x and y coordinates in the range of the grid points where the intersection points are selected are each set in the range of 0 mm to 200 mm, which includes a value (192 mm) obtained by dividing the chip diameter (96mm) by the minimum magnification (0.5) of the chip width. The range of the y coordinates may be from 0 mm to 100 mm without being changed. Then, straight lines parallel to the y-axis are arranged at intervals of 25 mm in the x direction from the origin. Other straight lines parallel to the x-axis are also arranged at intervals of 25 mm in the y direction. Three different optional points are selected from these grid points thus formed. The reduction ratio a of the width of an ellipse passing through each of the combinations of three intersection points is determined through solution of high-order simultaneous equations, i.e., Formulae 1 to 3 and 8.

Figures 13, 14:
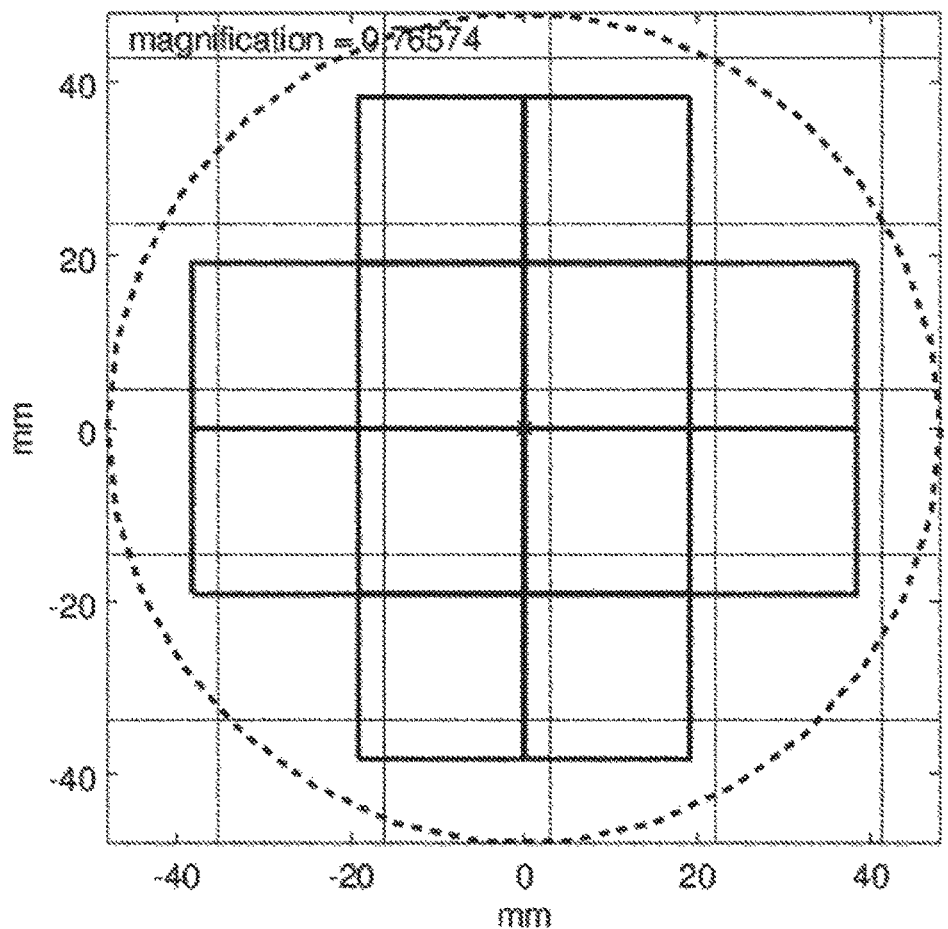
FIG. 13 illustrates another example of the chip layout in the second example.
FIG. 14 is a table showing candidate solutions obtained in a third example and the associated number of effective chips.

The 15 candidate solutions thus obtained and the respective maximum numbers of effective chips are shown in FIG. 14. FIG. 14 shows the number of effective chips (effective chip number), the ellipse reduction ratio (chip magnification), the chip length and width, and the center position (x and y coordinates) of an effective region of a chip coordinate system having its origin located at the chip center.

Figure 15:
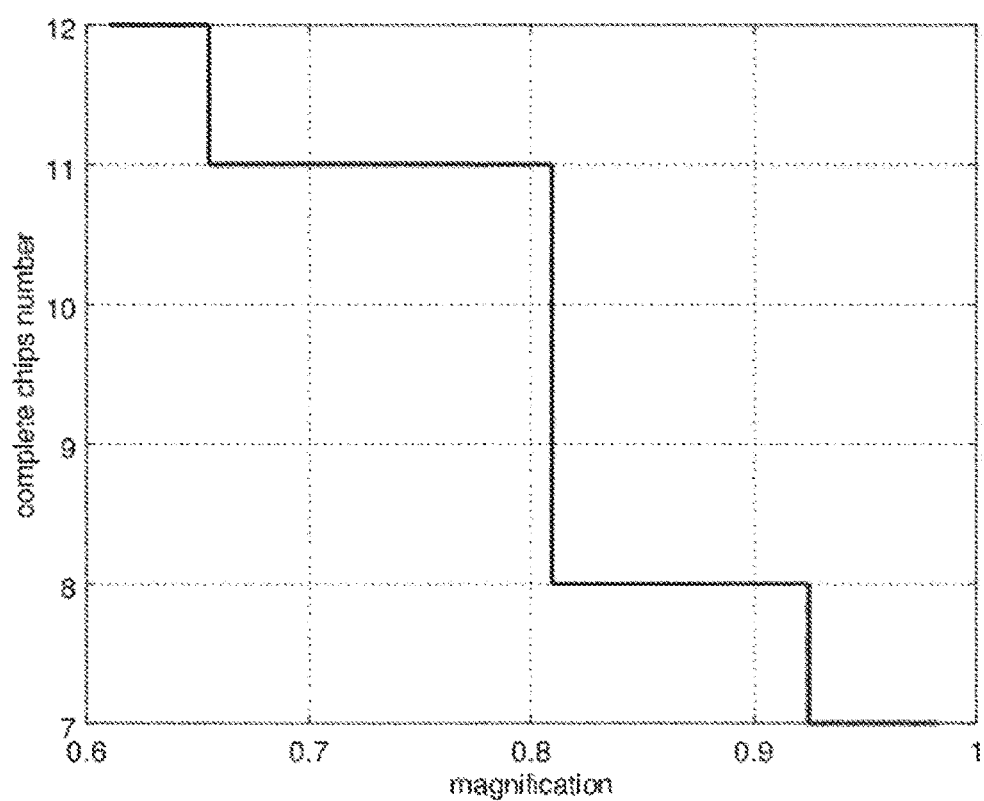
FIG. 15 illustrates the relation between the magnification of the chip width of the third example and the associated number of effective chips.
Figure 16:
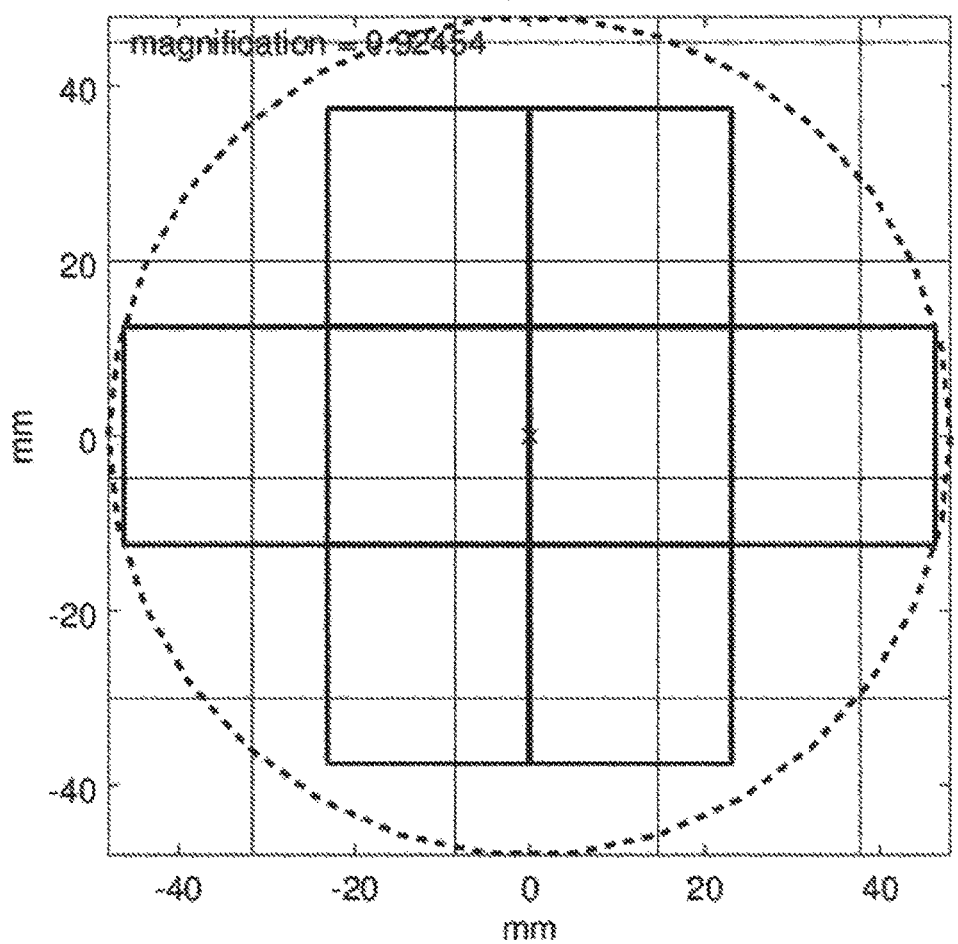
FIG. 16 illustrates an example of the chip layout in the third example.
Figure 17:
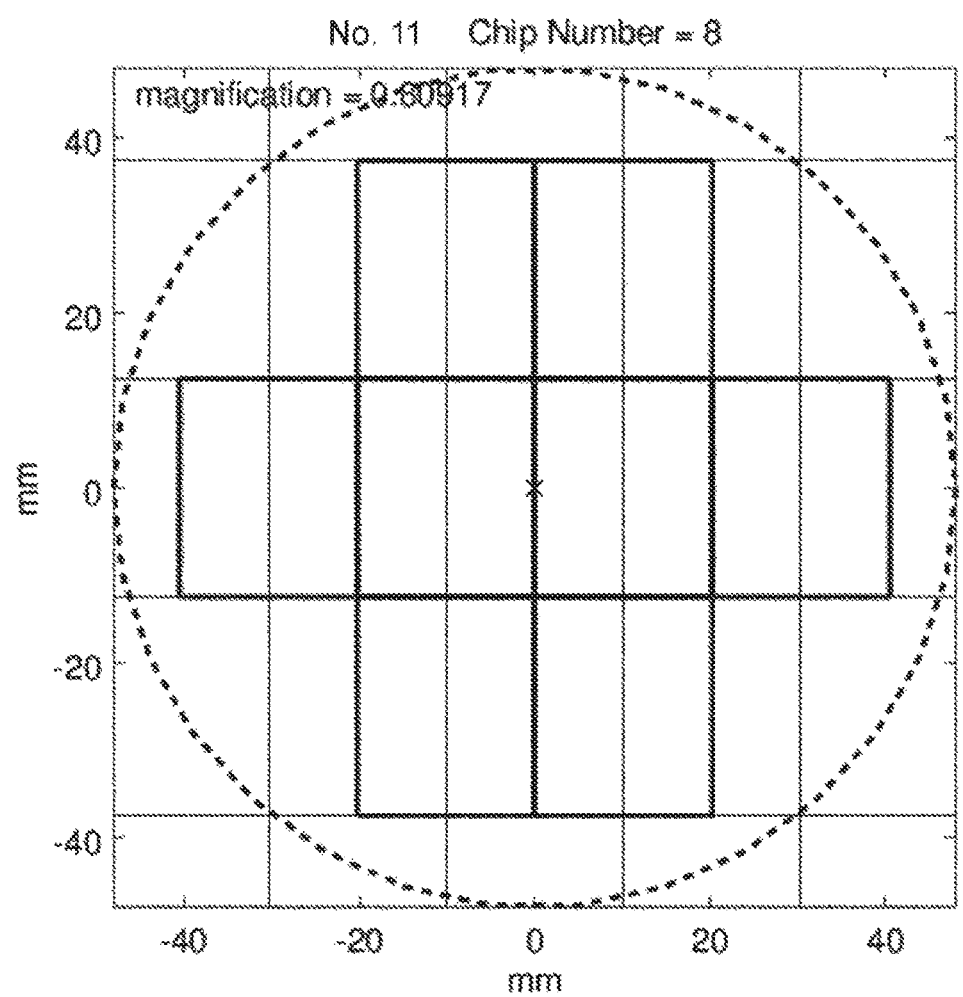
FIG. 17 illustrates another example of the chip layout in the third example.

FIG. 15 shows the maximum number of effective chips for the magnification of the chip width of each candidate solution. In this case, as the magnification of the chip width decreases, the number of effective chips increases. Thus, the number of effective chips cannot determine whether or not the chips have a suitable width. However, if the numbers of effective chips in the candidate solutions are equal, one of the candidate solutions having a greater chip magnification can provide a larger chip area, and is thus advantageous. The chip layout of the fifth candidate solution shown in FIG. 16 and the chip layout of the eleventh candidate solution shown in FIG. 17 both provide a maximum of eight effective chips. However, the fifth candidate solution that allows the chip width to be large is more advantageous.

FOURTH EXAMPLE

In the fourth example, a method for efficiently selecting a combination of three grid points will be described.

Figure 18:
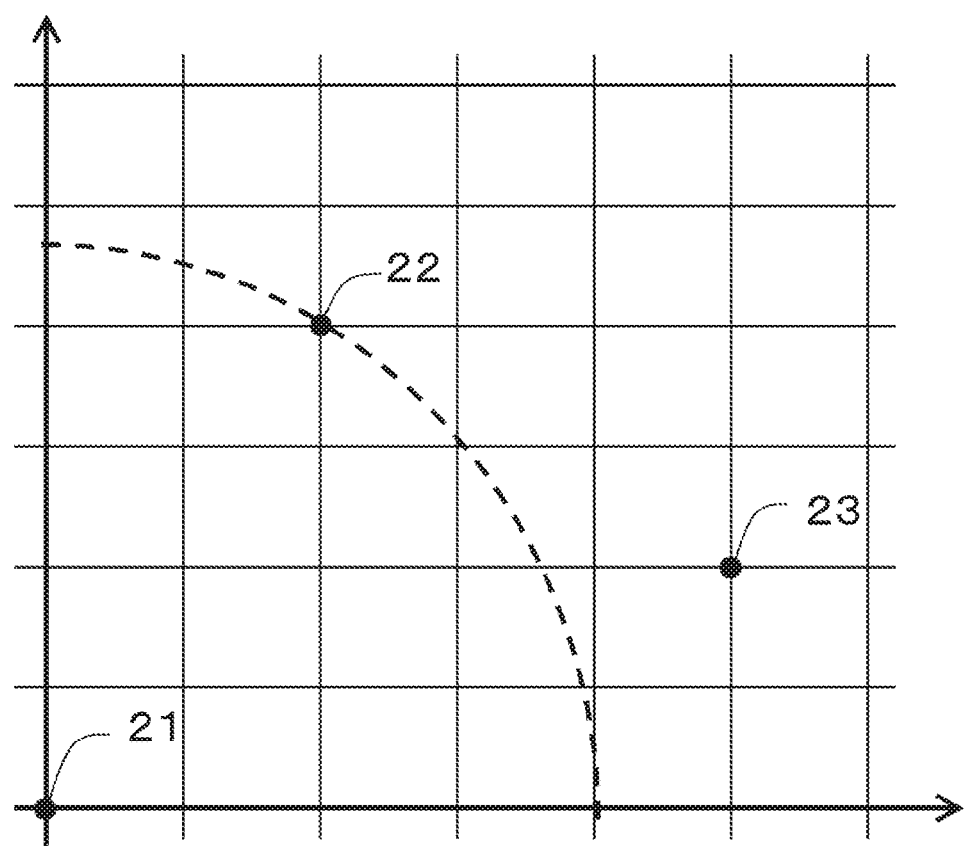
FIG. 18 illustrates how grid points are selected in a fourth example.

To efficiently select a combination of three grid points in step S5 shown in FIG. 1, one of all grid points on the grid shown in FIG. 18 which has the smallest x and y coordinates is defined as an origin 21 of a chip grid coordinate system, and a first grid point is determined to be the origin 21 of the chip grid coordinate system. A second grid point 22 is optionally selected from the grid points other than the origin, and a third grid point 23 is optionally selected from the grid points farther from the origin than the second grid point. Setting up such conditions to select the first to third grid points allows the number of combinations of three grid points to be less than extracting all combinations of three grid points from all grid points does, and can reduce the number of process steps of arithmetic processing and the operation time.

FIFTH EXAMPLE

In the fifth example, a combination of ineffective grid points will be described.

As a combination of three grid points excluded in step S6 shown in FIG. 1, a combination of selected three grid points aligned with one another is excluded, because the three grid points aligned with one another cannot form an ellipse. It is useless to select a plurality of combinations of three grid points forming congruent triangles. Thus, only one of such combinations of the triangles where three pairs of corresponding sides are each equal in length is left, and the other ones are excluded. Even if these combinations are excluded, necessary candidate solutions can be encompassed. To reduce the operation time, a combination of three grid points may be excluded based on the lengths of sides of the resultant triangle, or based on the interior angles of the triangle.

SIXTH EXAMPLE

In the sixth example, ineffective candidate solutions will be described.

As a candidate solution excluded in step S8 shown in FIG. 1, a candidate solution that does not satisfy at least one of an intersection point condition 1 and an intersection point condition 2 both described below is excluded. This is because, even if the wafer center is moved in the longitudinal or lateral direction of chips, the number of effective chips does not decrease. In addition, a candidate solution that does not satisfy at least one of an intersection point condition 3 and an intersection point condition 4 both described below is also excluded. This is because an intersection point is on an ineffective arc, and a chip including the intersection point is ineffective. In addition, if a wafer has an orientation flat, a candidate solution that does not satisfy an intersection point condition 5 described below is also excluded. This is also because a chip including an intersection point is not effective.

Intersection Point Condition 1: The product of maximum and minimum values of the x coordinates of three intersection points is negative.

Intersection Point Condition 2: The product of maximum and minimum values of the y coordinates of three intersection points is negative.

Intersection Point Condition 3: The absolute value of each of the x coordinates of three intersection points is not less than half the chip width.

Intersection Point Condition 4: The absolute value of each of the y coordinates of three intersection points is not less than half the chip length.

Intersection Point Condition 5: If a wafer has an orientation flat, values of the y-coordinates of three intersection points are greater than the value of the y coordinate of an effective orientation flat line.

SEVENTH EXAMPLE

In the seventh example, an embodiment of an arithmetic device according to the present disclosure will be described.

Figure 19:
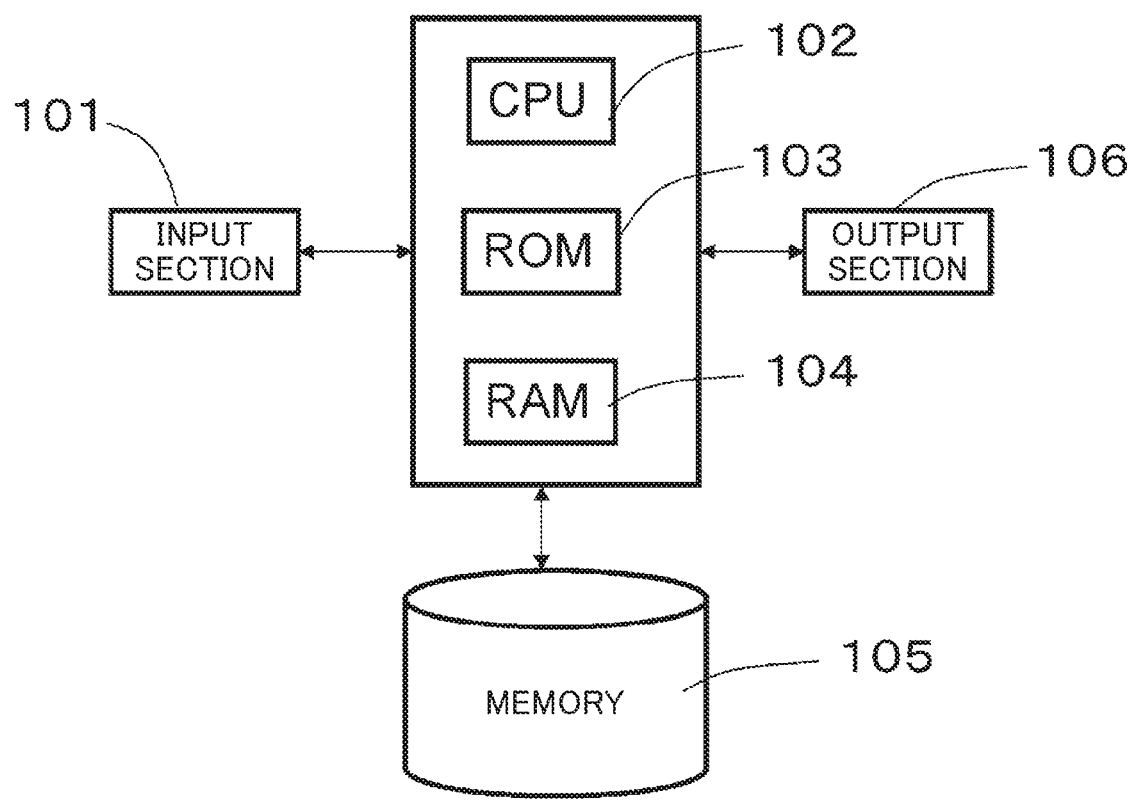
FIG. 19 is a block diagram showing a configuration of an arithmetic device.

FIG. 19 is a block diagram showing a configuration of an arithmetic device according to this embodiment. This diagram shows an arithmetic device, which is a computer including an input section 101, a central processing unit (CPU) 102, a read only memory (ROM) 103, a random access memory (RAM) 104, a memory 105, and an output section 106.

The CPU 102 of the arithmetic device thus configured mainly executes the steps shown in FIG. 1 in accordance with a program. Specifically, the arithmetic device includes an initial value selector, a change condition selector, a variation range selector, a region selector, a grid point extractor, a grid point excluder, a candidate solution calculator, a candidate solution excluder, a chip dimension calculator, a chip number calculator, and a selector. The initial value selector determines an initial condition of the shape of chips included in a substantially circular wafer effective region to form a grid plane of a chip grid corresponding to the condition of the shape of the initial chips (step S1). The change condition selector determines a condition on which the chip length and width are changed (step S2). The variation range selector defines the variation range in which the chip shape varies (step S3). The region selector defines a region of the grid plane within which an ellipse obtained by maximizing the periphery of the wafer effective region is, in accordance with the variation range (step S4). The grid point extractor extracts combinations of three grid points included in the region (step S5). The grid point excluder excludes an unnecessary combination of grid points from the extracted combinations of three grid points (step S6). The candidate solution calculator determines an ellipse intersecting with the three grid points of each of the extracted combinations and having major and minor axes parallel to the grid lines, and calculates a candidate solution of each of the ellipses (step S7). The candidate solution includes the rate of change of the length and width of a portion of each ellipse in at least the wafer effective region and the number of grid cells included in the ellipse, i.e., the number of effective chips. The candidate solution excluder excludes an unnecessary candidate solution from the candidate solutions (step S8). The chip dimension calculator calculates the chip length and width of the candidate solution by multiplying the condition of the shape of the initial chips by the rate of change of the length and width of the candidate solution (step S9). The chip number calculator determines the maximum number of effective chips and the center position of the wafer effective region based on the chip length and width and a condition of the wafer effective region both corresponding to the candidate solution (step S10). The selector selects, as the shape of chips to be designed, a solution that allows the number of effective chips to be greatest within the requirements of the layout design of semiconductor chips from the candidate solutions (step S11). The detailed functions of these elements have been described with reference to FIG. 1 and the foregoing examples, and thus, description of these functions will be omitted.

The arithmetic device may be a cloud server that is connectable via the Internet.

Figure 20:
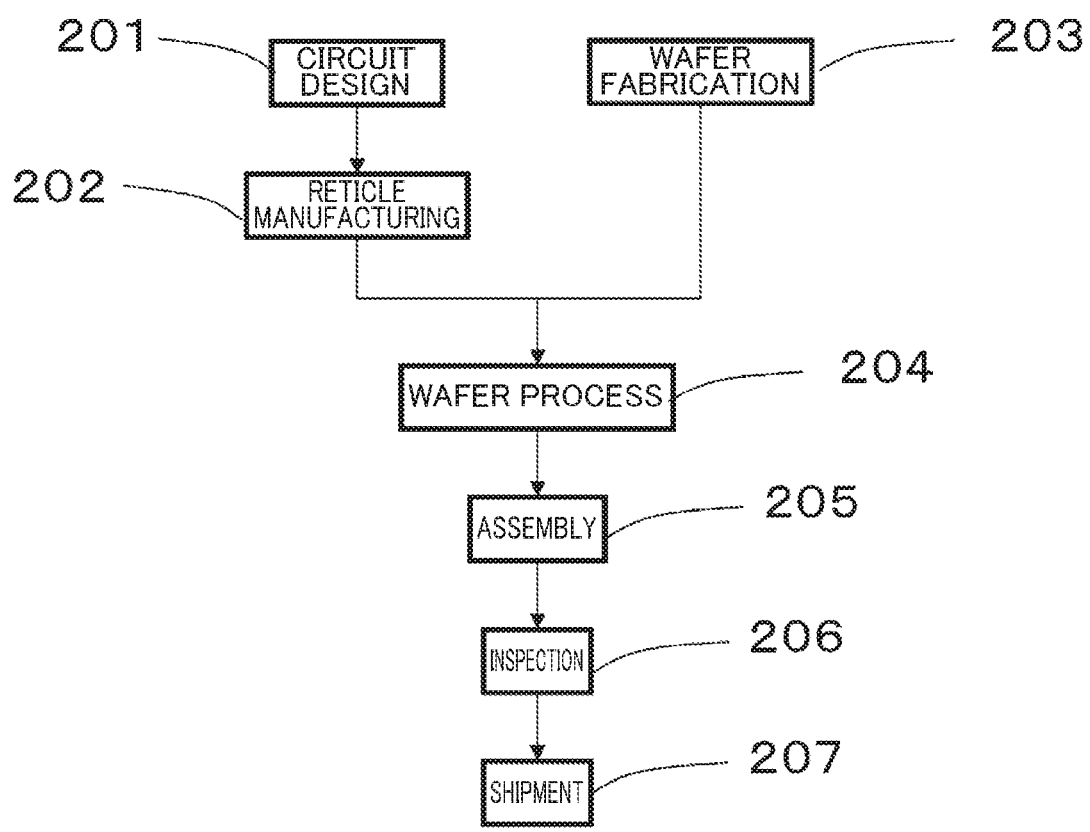
FIG. 20 is a flowchart showing the general flow of a process for fabricating a semiconductor device.

Next, a process for fabricating a semiconductor device using the arithmetic device (a method for fabricating a semiconductor chip) will be described. FIG. 20 shows the general flow of a process for fabricating a semiconductor device.

In circuit design 201, a circuit of the semiconductor device is designed through use of the arithmetic device and a CAD system for circuit design. In reticle manufacturing 202, a reticle is manufactured based on the designed circuit pattern. Meanwhile, in wafer fabrication 203, a wafer is fabricated using a material such as silicon.

A wafer process 204 is referred to as a preceding process, in which the mask and wafer are used to form an actual circuit on a wafer by lithography using the aligner. Next assembly 205 is referred to as a subsequent process, which is a process of obtaining semiconductor chips using the wafer fabricated in step 5. This process includes assembling steps, such as an assembly step (dicing, bonding) and a packaging step (chip encapsulation). Next, inspections 206, such as an operation check test and a durability test for a semiconductor device fabricated in the assembly 205, are performed. After these processes, the semiconductor device is finished. The finished semiconductor device is shipped (process 207).

The wafer process 204 shown in FIG. 20 includes the following steps. Specifically, the steps include an oxidation step for oxidizing the surface of a wafer, a chemical vapor deposition (CVD) step for depositing an insulating film on the wafer surface, an electrode formation step for forming an electrode on the wafer by vapor deposition, an ion implantation step for implanting ions into the wafer, a resist processing step for applying a photosensitizer to the wafer, an exposure step for transferring a circuit pattern to the wafer that has undergone the resist processing step by using the aligner, a development step for developing the water exposed in the exposure step, an etching step for etching away a portion of the water other than a resist image developed in the development step, and a resist removal step for removing the resist unnecessary after etching. Repeating these steps allows multiple circuit patterns to be formed on the wafer.

It is needless to say that the object of the present disclosure is achieved also if a storage medium in which a program code of software implementing the functions of the foregoing embodiment is stored is supplied to a circuit design system, and the system or a computer (or a CPU or a microprocessor unit (MPU)) of an apparatus reads, and executes, the program code stored in the storage medium.

In this case, the program code itself read from the storage medium implements the functions of the foregoing embodiment, and the storage medium storing the program code is included in a configuration for implementing the present disclosure.

Examples of the storage medium for supplying a program code include a flexible disk, a hard disk, an optical disk, a magneto-optical disk, a CD-ROM, a CD-R, a magnetic tape, a nonvolatile memory card, and a ROM.

Further, it goes without saying that the above statement applies not only to a case where executing the program code read by the computer allows the functions of the foregoing embodiment to be implemented, but also to a case where an operating system (OS) or any other system in action on the computer performs a portion or the entirety of an actual process, which provides the functions of the foregoing embodiment.

Furthermore, it goes without saying that the above statement applies also to a case where the program code read from the storage medium is written into a memory provided for an expansion board inserted in the computer or an expansion unit connected to the computer, then the CPU or any other unit included in the expansion board or the expansion unit performs a portion or the entirety of the actual process based on an instruction of the program code, and the process provides the functions of the foregoing embodiment.

INDUSTRIAL APPLICABILITY

The present disclosure relates to a method for determining the length and width of a pattern reticle for use to fabricate a semiconductor element, an imaging element (such as a charge-coupled device (CCD)), a liquid crystal display element, a thin film magnetic head, or any other element, and a method for deter determining the layout of shot regions on a wafer using an aligner.

DESCRIPTION OF REFERENCE CHARACTERS

S1 to S11 Step
11 Chip Grid
12 Wafer Effective Region Periphery
13 Longitudinally Maximized Ellipse
14 Laterally Maximized Ellipse
15 Range of Chip Grid
16 First Grid Point
17 Second Grid Point
18 Third Grid Point
19 Ellipse
20 Chip Grid Corresponding to Candidate Solution
21 First Grid Point Fixed at Coordinate Origin
22 Second Grid Point Selected From Grid Points Other Than Coordinate Origin
23 Third Grid Point Farther From Origin Than Second Grid Point
101 Input Section
102 CPU
103 ROM
104 RAM
105 Memory
106 Output Section
201 Circuit Design
202 Reticle Manufacturing
203 Wafer Fabrication
204 Wafer Process
205 Assembly
206 Inspection
207 Shipment

The invention claimed is:

1. A method for designing a semiconductor chip, the method comprising:
   an initial value setting step of determining an initial condition of a shape of chips included in a substantially circular wafer effective region to form a grid plane of a chip grid corresponding to the initial condition of the shape of the chips;
   a variation range setting step of determining a variation range in which the shape of the chips varies;
   a region setting step of defining a region within which all ellipses obtained by changing a periphery of the wafer effective region in the grid plane are included, in accordance with the variation range;
   a grid point extraction step of extracting combinations of three grid points included in the region;
   a candidate solution calculation step of determining an ellipse intersecting with the three grid points of each of the extracted combinations and having major and minor axes parallel to grid lines, and calculating a candidate solution of each of the ellipses, the candidate solution including a rate of change of a length and width of a portion of each ellipse in at least the wafer effective region and the number of effective chips, the number of effective chips being the number of grid cells included in the ellipse;

a chip dimension calculation step of calculating a chip length and width of the candidate solution by multiplying the initial condition of the shape of the chips by the rate of change of the chip length and width of the candidate solution;

a chip number calculation step of determining the maximum number of effective chips and a center position of the wafer effective region, based on the chip length and width corresponding to the candidate solution and a condition of the wafer effective region; and a selection step of selecting, as a shape of a chip to be designed, a solution that allows the number of effective chips to be greatest within a requirement of layout design of a semiconductor chip from the candidate solutions.

2. The method of claim 1, further comprising:
a change condition setting step of setting a condition on which the chip length and width are changed as a precondition for determining the range in which the shape of the chips varies in the variation range setting step.

3. The method of claim 1, further comprising:
a grid point combination exclusion step of excluding an unnecessary combination of three grid points from the combinations of the three grid points extracted in the grid point extraction step.

4. The method of claim 1, further comprising:
a candidate solution exclusion step of excluding an unnecessary candidate solution from the candidate solutions calculated in the candidate solution calculation step.

5. The method of claim 2, wherein
a condition that a product of lengths of the major and minor axes of the ellipse be fixed is set in the change condition setting step.

6. The method of claim 2, wherein
a condition that a ratio between lengths of the major and minor axes of the ellipse be fixed is set in the change condition setting step.

7. The method of claim 2, wherein
a condition that a length of one of the major or minor axis of the ellipse be fixed is set in the change condition setting step.

8. The method of claim 1, wherein
in the grid point extraction step, a first grid point is fixed, a second grid point is selected from grid points except the first grid point, and a grid point to which a distance from the first grid point is longer than a distance between the first and second grid points is selected as a third grid point.

9. The method of claim 3, wherein
in the grid point combination exclusion step, at least one of overlapping ones of combinations of three grid points aligned, combinations of three grid points forming congruent triangles, and combinations of triangles where three pairs of corresponding sides are each equal in length is excluded.

10. The method of claim 4, wherein
in the candidate solution exclusion step, a candidate solution applying to at least one of: a case where a triangle having three grid points as vertexes does not include a wafer center; a case where a chip including three grid points is ineffective; and a case where, if a wafer has an orientation flat parallel to an x-axis at a position having a smaller y coordinate than that of the wafer center, at least one of y coordinates of three intersection points is less than a y coordinate of an effective orientation flat line is excluded.

11. A non-transitory storage medium storing a semiconductor chip design program for making a computer execute the method of claim 1.

12. A method for fabricating a semiconductor device, the method comprising:
fabricating a semiconductor device designed through use of the method of claim 1.

13. An arithmetic device comprising:
an initial value selector configured to determine an initial condition of a shape of chips included in a substantially circular wafer effective region to form a grid plane of a chip grid corresponding to the initial condition of the shape of the chips;

a variation range selector configured to determine a variation range in which the shape of the chips varies;

a region selector configured to define a region within which all ellipses obtained by changing a periphery of the wafer effective region in the grid plane are included, in accordance with the variation range;

a grid point extractor configured to extract combinations of three grid points included in the region;

a candidate solution calculator configured to determine an ellipse intersecting with the three grid points of each of the extracted combinations and having major and minor axes parallel to grid lines, and calculate a candidate solution of each of the ellipses, the candidate solution including a rate of change of a length and width of a portion of each ellipse in at least the wafer effective region and the number of effective chips, the number of effective chips being the number of grid cells included in the ellipse;

a chip dimension calculator configured to calculate a chip length and width of the candidate solution by multiplying the initial condition of the shape of the chips by the rate of change of the chip length and width of the candidate solution;

a chip number calculator configured to determine the maximum number of effective chips and a center position of the wafer effective region, based on the chip length and width corresponding to the candidate solution and a condition of the wafer effective region; and a selector configured to select, as a shape of a chip to be designed, a solution that allows the number of effective chips to be greatest within a requirement of layout design of a semiconductor chip from the candidate solutions.

* * * * *